United States Patent [19]

Watkins

[11] Patent Number: 4,802,691

[45] Date of Patent: Feb. 7, 1989

[54] HEADREST

[76] Inventor: James C. Watkins, 103 Brown Pl., Newnan, Ga. 30263

[21] Appl. No.: 37,039

[22] Filed: Apr. 10, 1987

[51] Int. Cl.$^4$ ............................................. A47C 7/36
[52] U.S. Cl. ..................................... 280/751; 297/395
[58] Field of Search ............... 280/751; 297/391, 395, 297/397

[56] References Cited

U.S. PATENT DOCUMENTS

| | | | |
|---|---|---|---|
| 2,404,109 | 7/1946 | Steele | 155/173 |
| 3,220,770 | 11/1965 | Schaeffer | 297/395 |
| 3,308,490 | 3/1967 | Cacioppo | 5/345 |
| 3,751,100 | 8/1973 | Keyes | 296/95 |
| 3,753,458 | 8/1973 | Lazarek | 160/354 |
| 3,804,458 | 4/1974 | Jannoni | 297/220 |
| 4,597,608 | 7/1986 | Duffy | 296/95 |
| 4,607,886 | 8/1986 | Mazhar | 297/395 |

FOREIGN PATENT DOCUMENTS

| | | | |
|---|---|---|---|
| 1815856 | 7/1970 | Fed. Rep. of Germany . | |
| 539056 | 3/1922 | France | 297/397 |
| 53678 | 12/1910 | Switzerland . | |

Primary Examiner—Charles A. Marmor
Assistant Examiner—Ross Weaver
Attorney, Agent, or Firm—Thomas & Kennedy

[57] ABSTRACT

A demountable headrest assembly for use in a cab type vehicle having a rear, windowed cab wall comprises a planar mounting board shaped to overlay a portion of the frame of the window in the cab wall, a cushion member mounted on one surface of the mounting board, a first mount affixed to the other surface of the mounting board for affixing the headrest assembly to the window frame, and a second mount adapted to be affixed to the frame of the window in the cab wall to which the first mount may be releasibly affixed.

4 Claims, 1 Drawing Sheet

HEADREST

BACKGROUND OF THE INVENTION

This invention relates to a headrest for use primarily in motor vehicles having a cab type driver and passenger compartment. Such vehicles include, but are not limited to, pick-up trucks, the tractor of a tractor-trailer combination, and certain types of recreational vehicles.

In a cab type vehicle, using a pick-up truck as an example, the driver and passengers, if any, are seated with their heads adjacent the rear wall of the cab, which has a large window extending thereacross. In present day models of such vehicles, the window has sliding panes so that it may be at least partially opened for ventilation. However, even in the most modern of these vehicles, there is no provision for the persons in the cab to rest their heads, unless they wish to lean their heads against the unyielding rear wall of the cab or the equally unyielding glass of the window. The lack of any sort of headrest can result in a great deal of discomfort for the driver and passengers, especially on long trips.

In addition, the proximity of the rear window or rear wall to the driver's head, and, of course to the heads of the passengers also can be a serious safety hazard, especially in the case of an accident, such as a rear end collision, which could result in the driver's head, for example, being severely impacted against the rear wall or rear window. This hazard is compounded when his head impacts the window, since there is the additional danger of broken glass. Even in the absence of severe impact, the possibility of whiplash is always present. It is to alleviate or eliminate this last danger that most passenger vehicles are, today, equipped with headrests.

SUMMARY OF THE INVENTION

The present invention is designed to provide a comfortable headrest for cab type vehicles which will at the same time function to protect the occupants of the cab from the numerous, previously described hazards of such cab type compartments.

While the invention will be most easily understood, and the merits thereof most clearly appreciated, from a description of the invention as adapted for use in a modern pick-up truck having an adjustable window extending across substantially the entire rear wall of the cab, it is to be understood that the invention is intended for use in, and readily adaptable to, such use in other types of cab type vehicles.

In a preferred form a portable, demountable headrest assembly which comprises a mounting board shaped and dimensioned to conform to the window frame, and a cushion of suitable resilient construction mounted on the board. The board is securely attached to the window frame in such a manner that it can be easily removed. The attaching means preferably comprises first and second strips of plastic material, the material of one of the strips forming minute loops, and the material of the other strip forming minute hooks so that when the two strips are pressed together, the hooks and loops are mated and a strong bond is formed between the two strips. On the other hand, the strips may be readily pulled apart without damage. Such materials are well know as fastening devices, one such being the widely used Velcro ®.

In mounting the headrest, a strip of Velcro ® or other such material is affixed to the window frame, and the mating strip is affixed to the back of the mounting board. The headrest can then be simply pressed into place, where it is held firmly in place. When it is desired to remove the headrest, the Velcro ® mounting strips can readily be pulled apart, hence the headrest assembly may be pulled free of its mounting. An ancillary advantage of such an arrangement is that the portable headrest of the invention may be used as, for example, a seat cushion.

Inasmuch as the mounting board is mounted on the frame of the window, it is spaced from the glass window and does not interfere with the sliding panes of the window. In addition, because it is larger than the glass portion of the window, no stress whatsoever is placed on the glass when the headrest is leaned against, only on the window frame. This feature of the invention adds an additional measure of safety to the assembly, since the possibility of damage to, or breakage of, the glass from heavy impact on the cushion is virtually eliminated.

In another form of the invention a headrest is provided for use in a vehicle cab having a seat mounted in front of and below a rear window of the type having a frame, two side panes fixedly mounted to the frame and two central panes slidably mounted to the frame for movement between closed positions between the two side panes and open positions behind the side panes. A headrest is mounted above the seat to a portion of the window frame to which one of the side panes is fixedly mounted. The headrest has a board that is mounted directly to the window frame portion spaced from the side pane and a cushion mounted to the board. With this arrangement the headrest may provide support to the head of a person seated upon the seat and inhibit both backlash and direct head to window pane contact in the event of a vehicular accident.

These and other features of the present invention will be more readily apparent from the following detailed description, read in conjunction with the drawings.

DETAILED DESCRIPTION

Figure 1:
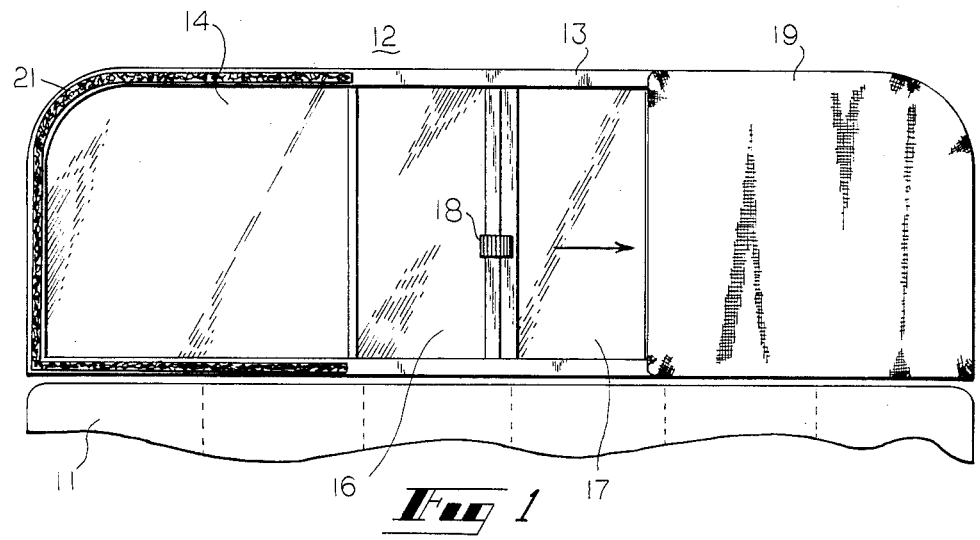
FIG. 1 is a front elevational view of a portion of the rear of a cab, showing the window and one headrest in place.

In FIG. 1 there is shown the rear of the cab of a pick-up truck, depicting a portion of the back 11 of the seat of the cab, and immediately above it, the rear window assembly 12, which comprises a channeled window frame 13 to which are mounted two fixed panes 14 of glass (only one of which is shown) and two slideable panes 16, 17 adapted to slide within the channel of frame 13 and provided with a suitable latch 18. One headrest assembly 19 of the invention is shown in place, mounted on the frame 13.

Figure 2:
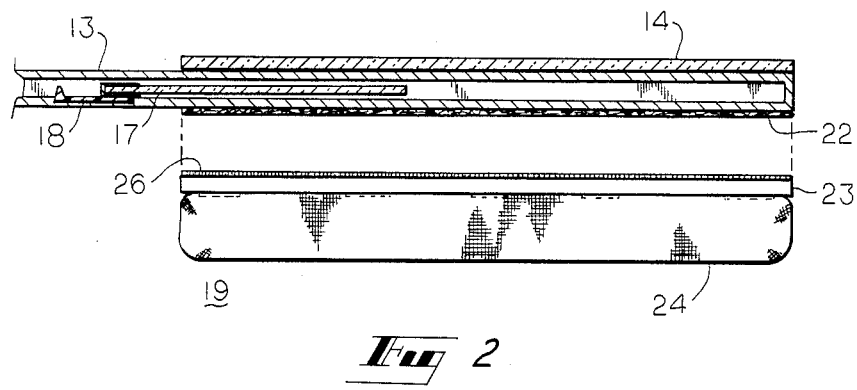
FIG. 2 is a plan view showing the window and frame in cross-section, and the headrest of the invention.

As can be seen in FIGS. 1 and 2, Velcro ® strips 21 and 22 are affixed to, and conform to the shape of the frame 13 at each side of the window assembly 12, substantially embracing that area of the window assembly 12 containing the fixed glass panes 14. Strips 21 and 22 are fixed to the frame 13 by any suitable means, such as, for example, a strong cement or glue.

The headrest assembly 19 comprises a substantially planar mounting board 23 which is preferably shaped to cover the end portion of window assembly 12 which includes frame 13 and the fixed pane 14, as best seen in FIG. 1. Board 23 may be molded or cut heavy plastic, or wood or any of a number of suitable materials having sufficient strength to withstand a heavy impact without bending or breaking. A cushion member 24 is mounted on the front side of board 23, and is firmly affixed thereto, as by cementing or gluing, for example. Member 24 may be as simple as a pillow, or as complex as a leather jacket stuffed with a resilient piling, such as, for example, foam rubber. The outer cover, whether leather, cloth, or vinyl, is preferably easily cleanable. It is desirable that member 24 be soft enough to be comfortable, but firm enough to provide support for a person's head under impact conditions. Affixed to the back side of board 23 is a Velcro ® strip 26, positioned and adapted to mate with strip 22. Strip 26 must be affixed to board 23 in a suitable manner, as by cementing, to insure its being able to withstand the pulling on assembly 19 required to separate strip 26 from strip 22 without its tearing loose from board 23.

As can best be seen in FIG. 2, headrest assembly 19, when mounted in position, is well separated from glass panes 14 and 17, and places no stress on them, nor does it interfere in any way with the movement of pane 17. On the other hand, because headrest assembly 19 is mounted on frame 13, and includes a rigid mounting board 23, it protects the head of the occupant of the cab from impacting the glass 14, and by the same token, protects the glass from breakage due to such impact. In addition, it is mounted in a manner that does not interfere wit the opening of the panes 16 and 17. Nor does it substantially restrict vision via a rearview mirror to the rear of the vehicle through the slideable panes when they are closed.

As can best be seen in FIG. 2, when headrest assembly 19 is detached from frame 13, it is a cushion or pillow which may be used as a seat cushion in, for example, a grandstand or arena, and remounted in position in the cab for use both as a headrest and head restraint.

The foregoing is a description of a preferred embodiment of the invention. Various changes and modifications of the preferred embodiment may occur to those skilled in the art without departure from the spirit and scope of the invention.

I claim:
1. For use in a cab type vehicle having a rear, windowed cab wall, a demountable headrest assembly comprising
   a substantially planar mounting board, said board being shaped to overlay a portion of the frame of the window in the cab wall,
   a cushion member mounted on one surface of said mounting board, and first mounting means affixed to the other surface of said mounting board for affixing said headrest assembly to said window frame and second mounting means adapted to be affixed to the frame of the window in the cab wall,
   said first and second mounting means being adapted to mate with each other to provide a firm mounting for said headrest assembly.
2. A demountable headrest assembly as claimed in claim 1, wherein one of said mounting means comprises a strip of plastic material forming a plurality of resilient loops, and the other of said mounting means comprises a strip of plastic material forming a plurality of resilient hooks adapted to mesh with the loops in the material of said one mounting means when the said strips are pressed together.
3. A demountable headrest assembly as claimed in claim 1 wherein said mounting board is made of impact resistant material.
4. In a vehicle cab having a seat mounted in front of and below a rear window of the type having a frame, two side panes fixedly mounted to the frame and two central panes slidably mounted to the frame for movement between closed positions between the two side panes and open positions behind the side panes, at least one headrest mounted above the seat to a portion of said window frame to which one of said side panes is fixedly mounted, said headrest having a board that is mounted directly to said window frame portion spaced from said side pane and a cushion mounted to said board whereby said headrest may provide support to the head of a person seated upon the seat and inhibit both backlash and direct head to window pane contact in the event of a vehicular accident.

* * * * *